United States Patent [19]

Sumins et al.

[11] Patent Number: 4,608,728
[45] Date of Patent: Sep. 2, 1986

[54] WIPER BLADE COMPONENTS

[75] Inventors: Edmund J. Sumins, Cheddington; Roger W. Baker, Hanworth, both of England

[73] Assignee: Trico Products Corporation, Buffalo, N.Y.

[21] Appl. No.: 694,720

[22] Filed: Jan. 25, 1985

[51] Int. Cl.⁴ .............................................. B60S 1/40
[52] U.S. Cl. ................................................. 15/250.32
[58] Field of Search .......................... 15/250.32–250.42

[56] References Cited

U.S. PATENT DOCUMENTS 3,416,180 12/1968 Deutscher et al. ............... 15/250.32

FOREIGN PATENT DOCUMENTS

| 660922 | 1/1965 | Belgium | 15/250.32 |
| 2803343 | 8/1979 | Fed. Rep. of Germany | 15/250.42 |
| 2905562 | 8/1979 | Fed. Rep. of Germany | 15/250.32 |
| 901436 | 7/1962 | United Kingdom | 15/250.32 |
| 1100069 | 1/1968 | United Kingdom | 15/250.32 |

Primary Examiner—Peter Feldman
Attorney, Agent, or Firm—E. Herbert Liss

[57] ABSTRACT

A molded plastic slidable latch member for retaining a side mounted wiper blade on a wiper arm having a laterally extending connecting pin is retained within a plastic insert. The rectangular plastic insert is retained between the flanges within a rectangular aperture in the web of a channel shaped metal yoke. Aligned cylindrical projections on each side wall of the insert lie within aligned openings in the flanges of the yoke. Aligned holes extending through the side walls of the insert and the projections serve to journal the laterally extending pin on the arm. Contact at the junction between the metal components of the arm and the metal yoke is precluded. A cover plate on the latch is externally accessible to permit manual actuation of the latch from a latched position engaging the pin to an unlatched position.

6 Claims, 6 Drawing Figures

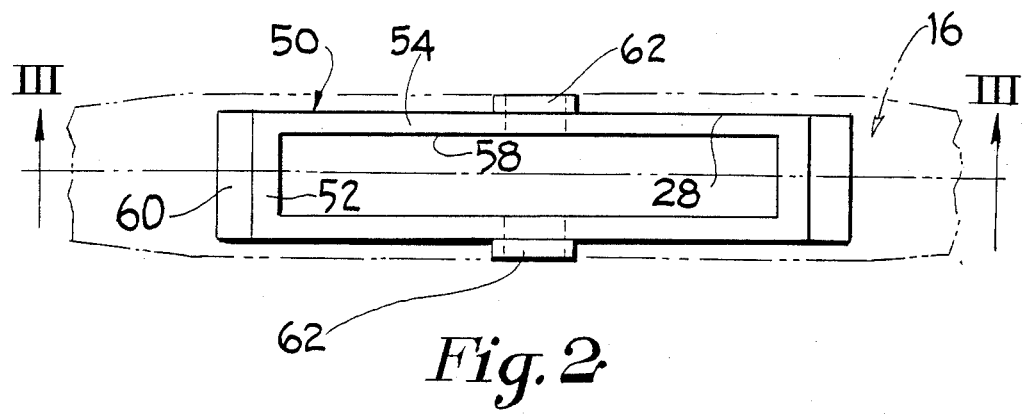
Fig. 2
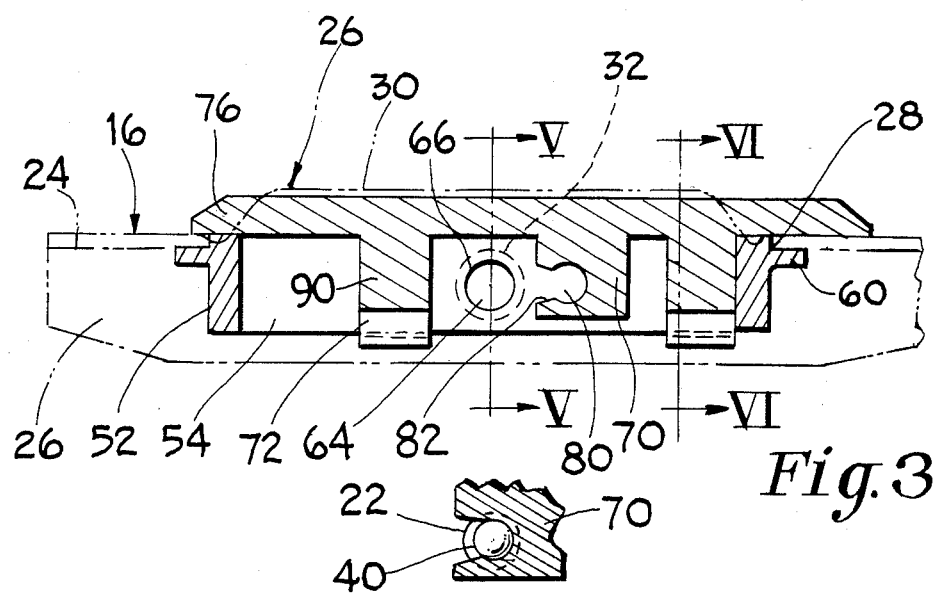
Fig. 3
Fig. 4
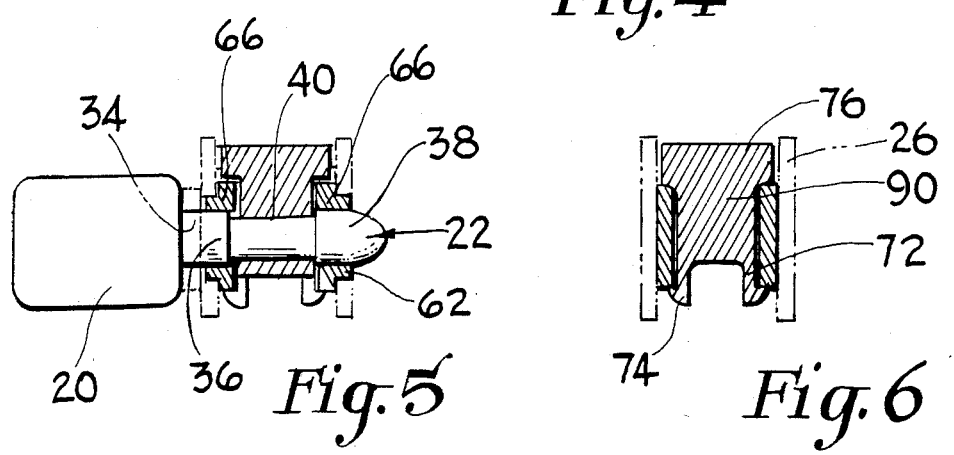
Fig. 5
Fig. 6

WIPER BLADE COMPONENTS

BACKGROUND OF THE INVENTION

The present invention relates to improvements in windshield wiper blades and more particularly an assembly for connecting the blade to a wiper arm especially for pin type side mounted arm to blade connection.

Windshield wiper assemblies for motor vehicles include a wiper blade assembly secured to an oscillating wiper arm assembly driven by a power source. The blade assembly comprises a pressure distributing superstructure which supports an elastomeric wiping element and an associated backing strip. The superstructure may include a primary yoke of generally inverted U-shape in lateral cross section having an elongate aperture in the web defined by opposite side walls of the yoke and a pair of aligned openings through the side walls of the aperature for receiving a laterally extending pin for removably securing the blade to the arm with the arm lying generally adjacent the side wall of the primary yoke.

Numerous means have been developed to removably secure a side mounted wiper blade to a wiper arm including plastic inserts mounted in the aperture of the primary yoke with associated latch means. One of the objectives of side mounting a blade with respect to the arm is to maintain a low profile to enable the blade to pass through a small space in those applications where the wiper arm and blade are concealed below the cowl in parked position.

It is also advantageous to provide a plastic insert for a metal superstructure to prevent corrosion and to reduce friction at the junction of components which move relative to each other and also to provide readily accessible and easily manipulatable latching means.

Prior art inserts as examplifed by Hoebrechts et al, U.S. Pat. No. 4,118,825 and Monarch et al, U.S. Pat. No. 4,324,019 permit the possibility of corrosion at the most vulnerable point where the pin bears in the holes of the side walls of the yoke. The corrosion at this point has been particularly bad when a protective finish on the yoke has been worn through by the pin to expose an unprotected area to salt spray from the road or atmosphere. The corrosion may produce a high friction joint and inhibit pivoting of the wiper blade around the pin; it also can cause enlargement of the opening and failure in addition to the unsightliness created. The insert shown and described in U.S. Pat. No. 4,324,019 discloses a fixed pin. The pin is latched to the end of the wiper arm rather than to the insert which obviates the use of a discrete pin or pin on arm arrangement. The disclosed insert in U.S. Pat. No. 4,118,825 does not provide for corrosion resistance at the openings in the side walls of the yoke and requires removal of the entire insert to release the blade from the arm.

SUMMARY

In accordance with the present invention, wiper blade components comprise a superstructure, a pin and an insert. The side portions of the insert have resilient flexibility in the lateral sense and have a pair of holes, one in each side portion, aligned transversely of the insert and are bounded by a pair of cylindrical bearing surfaces for journalling portions of the pin adjacent each end thereof. Each of the bearing surfaces extends through a respective one of the side portions and through an external hollow projection which in turn extends through or deep into a respective one of the openings in the side walls of the yoke in order to keep the pin out of contact with the yoke.

To enable the pin to be latched to the wiper blade in a simple and effective manner, the insert is preferably provided with a latch member which is accessible from outside of the insert and is movable between a latched position which a keeper on the latch member protrudes into a space between the aligned holes in the side portions of the insert to engage a circumferential groove between the end portions of the pin, and an unlatched position in which the keeper lies withdrawn from said space and disengaged from the pin.

The principle object of the present invention is to provide a connector for side mounting a wiper arm to a metal section of a wiper blade which reduces the possibility of corrosion occurring at the junction between moving parts of the connector components.

Another object of the invention is to provide a grooved pin type connector for side mounting and removably latching a wiper arm to a wiper blade in which the latch is easily manipulatable to and from a latched position and is readily accessible and in which all of the connecting components remain secured together and to the blade for latching and unlatching.

A further and more specific object of the invention is to provide an insert for connecting a side mounted wiper blade having a superstructure with an apertured web portion to a wiper arm which insert lies substantially entirely within the profile of the blade and which includes a latch operator readily accessible for manual manipulation at an exposed position.

Other objects and advantages of the invention will be apparent from the following detailed description taken in connection with the accompanying drawings.

DESCRIPTION OF THE DRAWINGS

FIG. 2 is a top plan view of the insert omitting the latch member but showing the main yoke of the wiper blade in chain lines;

FIG. 3 is a longitudinal section taken on line III—III through FIG. 2 with the latch member in the unlatched position;

FIG. 4 is a fragmentary cross sectional view similar to FIG. 3 showing the pin engaged with the latch member;

FIG. 5 is a transverse section taken along the line V—V of FIG. 3 with the latch member in the latched position; and FIG. 6 is a transverse section taken along the line VI—VI of FIG. 3 with the latch member in the unlatched position.

DETAILED DESCRIPTION

Figure 1:
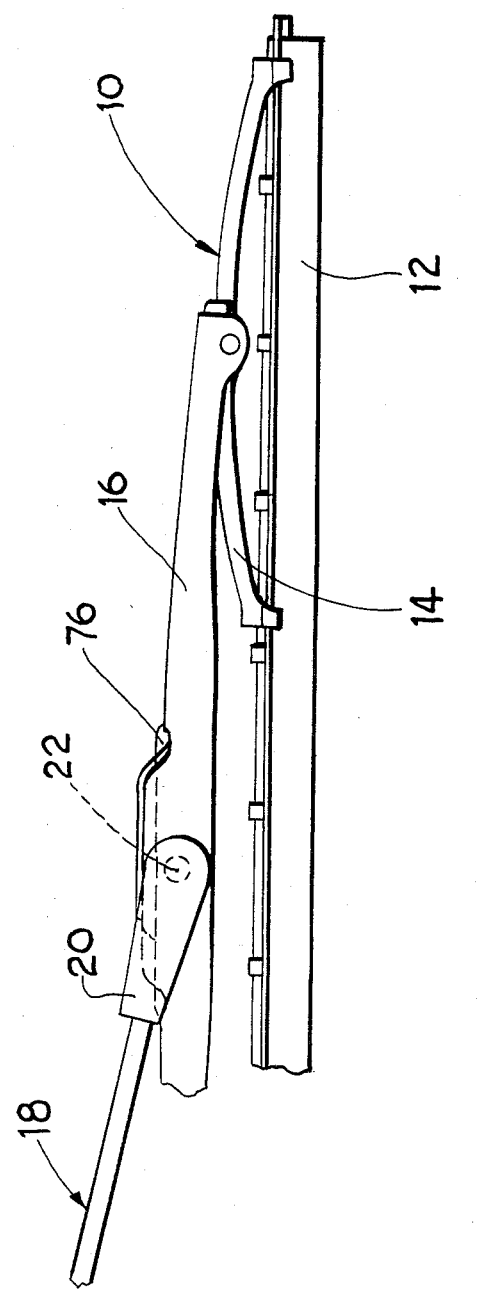
FIG. 1 is a side view of parts of a wiper arm and a wiper blade shown in assembly with an insert and latch member.

Referring initially to the general assembly (FIG. 1), a wiper blade 10 is shown comprising an elastomeric wiper strip 12 and subsidiary yokes 14 which are pivotally mounted with respect to a main yoke 16 of metal. A wiper arm 18 terminates in a rigid plastics moulding 20 which lies alongside the main yoke 16 and is releasably pivotally connected to the main yoke 16 by a cylindrical pin 22. The pin 22 may be permanently rigidly supported by the moulding and projects from it at right angles to the length of the adjacent part of the wiper arm 18. Alternatively the pin 22 can be a discrete member which is releasably connected in known manner to a connector permanently attached to the free end of the wiper arm 18 in place of the moulding 20. An insert and latch member, present in FIG. 1 but almost totally hidden, contribute to connecting the main yoke 16 to the pin 22.

As indicated by the chain lines in FIG. 3, the majority of the main yoke 16 is of inverted channel sections with a web 24 and flanges 26. In a central portion the main yoke 16 widens slightly as shown in FIG. 2 and there presents a rectangular aperture 28, the ends of which are defined by the web 24 and the sides of which are defined by the flanges 26. The flanges 26 extend somewhat upwards along each side of the aperture 28 to upper edges 30. A pair of transversely aligned holes or openings 32 is formed in the flanges 26 to permit the pin 22 to enter and extend from side to side of the main yoke 16. In this example there is a gap 1 mm wide between the moulding 20 and the yoke 16 when the pin is latched to the yoke. However, should a discrete pin having a central collar 38 be employed, the collar 38 would occupy the position indicated in chain lines in FIG. 5. The outer end part of the pin, whether permanently supported by the moulding or releasably connected to a connector, has two cylindrical portions 36, 38 separated by a circumferential groove 40, the cylindrical portion 38 having a tapering extremity.

The insert (FIGS. 2 to 6) is a single piece of moulded plastics having a generally rectangular body 50 which has a length substantially greater than its width. More particularly, the body 50 comprises a pair of end portions 52 bridging a pair of laterally resilient side portions 54 to present a hollow rectangular frame defining a corresponding opening 58. A pair of external lips 60 projects longitudinally in opposite directions from the end portions 52. The lips 60 are disposed below the upper peripheries of the end portions 52 by an amount corresponding to the thickness of the web 24 of the yoke 16. A pair of hollow external cylindrical projections 62 having circular internal and external peripheries projects laterally in opposite directions from the side portions 54. The projections 62 are radially dimensioned to fit the openings 32 in the flanges 26. A pair of aligned holes 64 extends through he side portions 54 and also through the projections 62, the holes 64 being bounded by a pair of cylindrical bearing surfaces 66 for the pin as later described.

The latch member (FIGS. 3 to 6) is a single piece of moulded plastic and has a block 70 depending from a rectangular plate-like cover 76 with chamfered ends which is longer than the aperture 28 and preferably has a running fit with the flanges 26 of the main yoke 16. On the underside of the cover 76 are two dependent stems 90 which are spaced from the ends of the cover and from each other. The stems 90 serve to retain and guide the cover for sliding over the aperture 28. Accordingly each stem is formed at its lower end with depending, laterally resilient, side flanges 72 with outwardly directed lips 74 chamfered as shown to enable them to snap engage with the lower edges of the insert as later described. The block 70, shaped for latching with the pin 22 and serving as a keeper, is disposed between the stems 90. The left-hand end of the block 70, as shown in FIG. 3, is recessed to form a part-cylindrical cavity 80 corresponding in diameter to that of the circumferential groove 40 in the pin 22. The cavity 80 has a slightly narrower mouth 82 at one side.

In assembly, the insert is introduced into the aperture 28 from below the main yoke 16. The lips 60 engage the underside of the web 24 when the upper periphery of the insert is flush with the adjacent upper surface of the web, thereby forming lap joints with the edges defining the ends of the aperture 28 and minimising the overall height when in assembly with the latch member. Furthermore, when the lips and web are brought into engagement the projections 62 on the insert align with the holes 32 in the yoke and, owing to the resilience of the side portions 54, snap into deep engagement with the holes 32. It should be apparent that the lips 60 locate and steady the insert in the yoke, and that the insert is wholly within the side profile of the yoke.

The latch member is then introduced, lips 74 first, from above through the opening 58 in the insert. The overall width of the latch member at the lips 74 exceeds the transverse width of the opening 58. The chamfering on the lips 74 and the upper side edges of the opening 58 causes inward deflection of the flanges 72. Thereafter the side portions 54, supported from outward deflection by the flanges 26 of the main yoke, cause inward deflection of the flanges 72. On reaching the lower edges of the side portions 54, the lips 74 snap outwardly into sliding engagement with the lower edges of the side portions 54. The cover 76 of the latch member is of sufficient extent to ensure that the opening 58 and the insert are always concealed regardless of whether the latch member is in its latched or unlatched position.

In the unlatched position of the latch member the stem 90 on the left in FIG. 3 does not obstruct insertion or withdrawal of the pin 22 through the holes 64. The spacing of the stems 90 from the ends of the cover 76 and from the block 70 is such that the stems do not interfere with either sliding or latching movements of the latch member.

The transverse dimension of the block 70 of the latch member corresponds with the axial dimension of the circumferential groove 40 in the pin 22. Also, the stems 90 and block 70 have a running fit with the side portions 54 of the insert. Thus, especially when the latch member is in its latched position, its presence ensures that the side portions 54 are prevented from accidental inward flexing. The projections 62 therefore remain fully engaged in the holes 32 in the main yoke 16 and the pin is borne for pivoting out of contact with the peripheries of the holes 32 in the main yoke 16 by the bearing surfaces 66. Furthermore, the latch member is unobtrusive, the major part of the cover 76 lying within the side profile of the main yoke 16 at the opening 28.

The wiper blade is mounted on the wiper arm by the following procedure. With the latch member in its unlatched position the leading end 38 of the pin 22 is inserted through one of the holes 64 into the space between the side portions 54, and through the other hole 64. Movement of the latch member to the left into its latched position as shown in FIG. 4 forces the mouth 82 against the groove 40 in the pin and to open so that the cavity 80 engages around the groove 40 with a snap action. Withdrawal of the pin 22 from the bearing surfaces 66 is then prevented by the interengagement of the perpendicular shoulder on the pin 22 with the adjacent side of the block 70.

The plastics insert and latch member are primarily intended for use with main yokes of metal but they can be applied to equivalent main yokes of plastics and provide means for latching pivot pins to them.

It should now be apparent that a unique wiper blade to arm connector assembly for mounting a wiper blade along side a wiper arm has been provided wherein the possibility of corrosion at the junction of moving parts has been minimized and in which a positive, readily accessible latching mechanism has been provided. A certain specific embodiment of the invention has been shown and described for the purposes of illustration but it will be apparent that in accordance with the broader aspects of the invention various modifications and other embodiments are possible within the scope of the invention. For example, other and different styles of keeper elements may be provided. Alternative embodiments may include other and different means for retaining a latch within the insert and for retaining the insert within the yoke. It is to be understood therefore that the invention is not limited to the specific arrangement shown but in its broadest aspects it includes all equivalent embodiments and modifications which come within the scope of the invention.

What is claimed is:

1. A wiper blade connector assembly for operatively connecting a windshield wiper blade along side a wiper arm having a laterally extending pin at its free end, the wiper blade comprising a superstructure including a metal yoke having a central section of generally inverted U-shape cross section defined by a web and opposite depending flanges, an elongate aperture in the web defined laterally by said depending flanges, a pair of transversely aligned openings in each one through each flange of the yoke; said pin having a circumferential groove forming opposed shoulders, said connector assembly comprising an insert of molded plastic of generally rectangular form having a length substantially greater than its width adapted to fit within said aperture, a lip at each end projecting longitudinally of the insert for forming lap joints with said web and having opposite side portions for lying within said aperture closely adjacent said opposite depending flanges, tranversely aligned cylindrical projections on the outer surface of each of said side portions adjacent said flanges, said projections being receivable within said openings, tranversely aligned holes extending through said side portions and said projections forming bearing surfaces for journaling said pin whereby said pin is maintained out of contact with the metal portion of said yoke, said insert including a latch member comprising a keeper element and a manually manipulatable latch operator accessible from an exposed portion of the wiper blade for manually moving said latch member between a latched position in which said keeper element protrudes into a space between the aligned holes in the side portions of the insert to engage the groove in the pin, and an unlatched position in which said keeper element lies withdrawn from said space and disengaged from the pin.

2. A wiper blade connected assembly as claimed in claim 1, wherein the transverse dimension of the keeper element corresponds to the distance between the aligned holes when the side portions of the insert are in a relaxed condition.

3. A wiper blade connector assembly according to claim 1 wherein the latch member is retainable on the insert for sliding engagement between the latched and unlatched positions.

4. A wiper blade connector assembly according to claim 1 characterized in that the latch member is retainable in the latched position by snap action with the pin.

5. A wiper blade connector assembly according to claim 1 characterized in that the latch member is a single piece of moulded plastics.

6. A wiper blade connector assembly according to claim 1 characterized in that said latch operator comprises a cover for said elongate aperture.

* * * * *